Oct. 21, 1958                E. A. SOLDAT                2,857,230
                           FISHING TACKLE BOX
Filed July 2, 1956                                    2 Sheets-Sheet 1
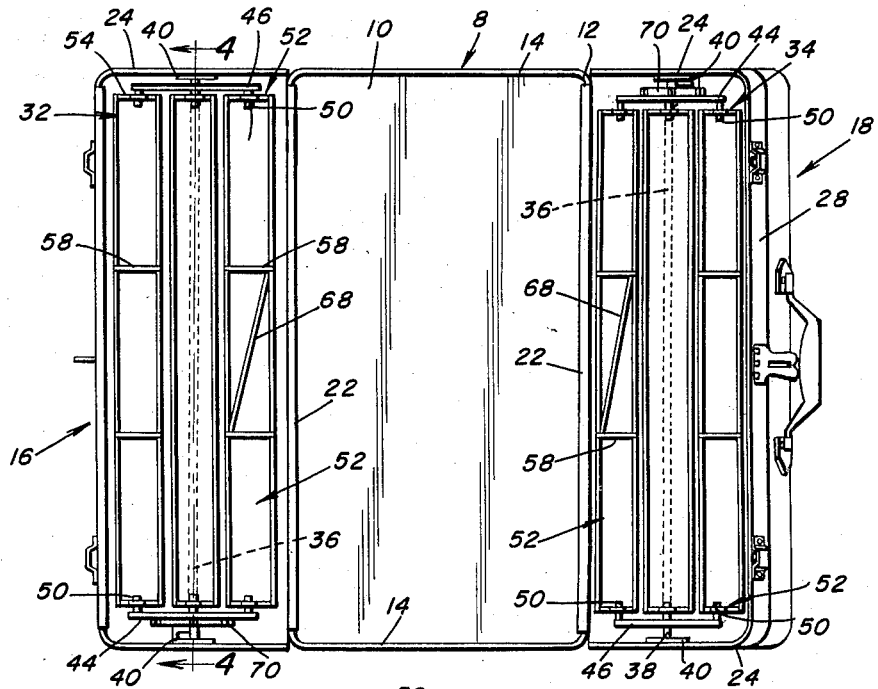
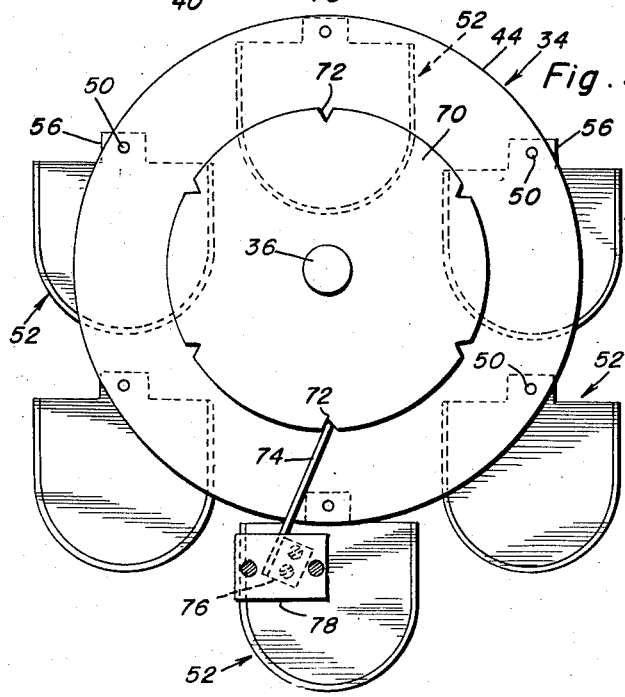
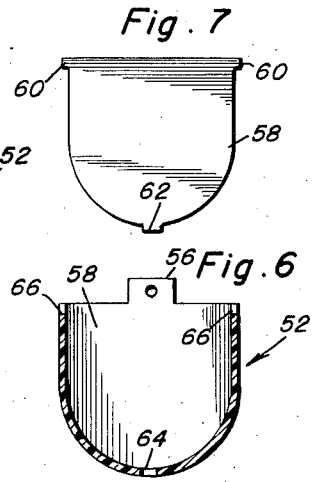
Ervin A. Soldat
       INVENTOR.

Oct. 21, 1958 — E. A. SOLDAT — 2,857,230
FISHING TACKLE BOX
Filed July 2, 1956 — 2 Sheets-Sheet 2
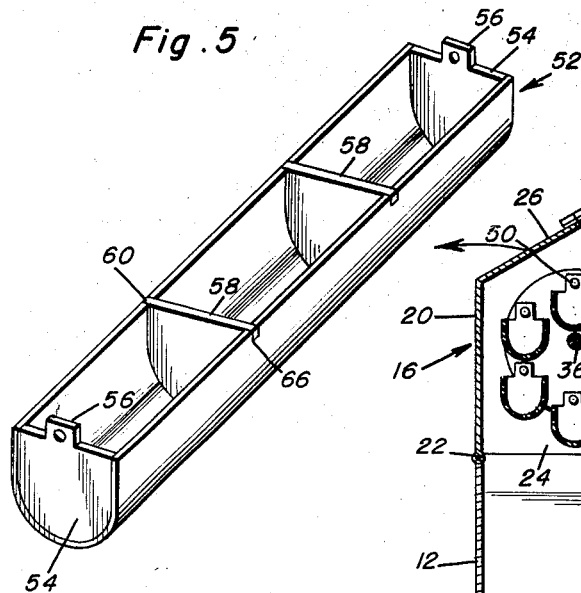
Fig. 5
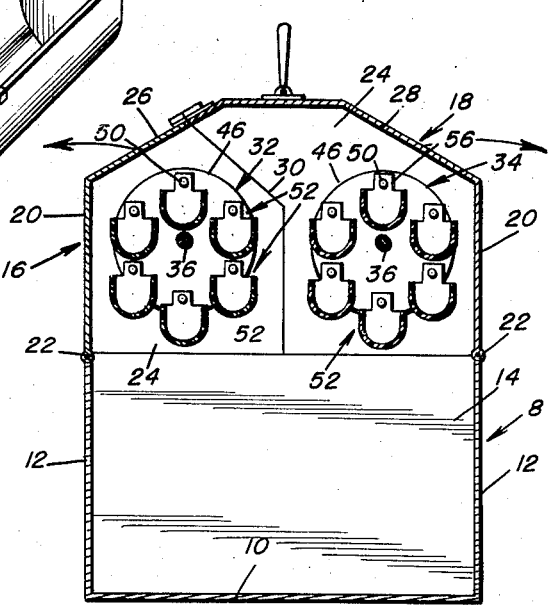
Fig. 2
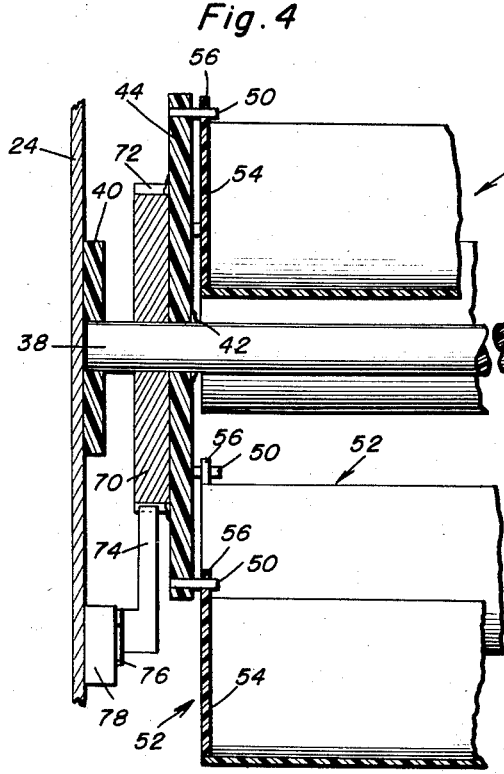
Fig. 4
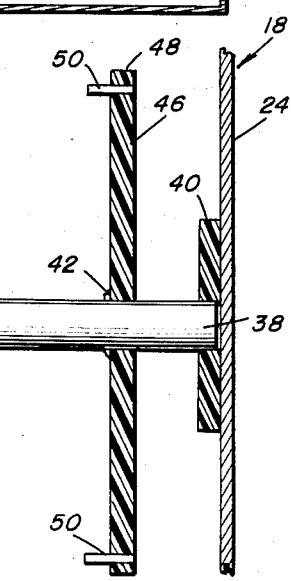
Ervin A. Soldat
INVENTOR.
BY
Attorneys United States Patent Office 2,857,230
Patented Oct. 21, 1958

2,857,230

FISHING TACKLE BOX

Ervin A. Soldat, Chicago, Ill.

Application July 2, 1956, Serial No. 595,239

2 Claims. (Cl. 312—267)

The present invention relates to an improved fishing tackle box for storing, carrying and transporting various articles of angling equipment such as rods, reels, tools and, what is more important, miscellaneous small articles such as plugs, fishhooks, snells, artificial bait, and the like.

Briefly, the preferred embodiment of the invention comprises a handle-equipped box which is characterized by a bottom or receptacle portion and a hood-type cover therefor, said cover being made up of hingedly mounted companion sections, each section being hollow and provided with a rotatably mounted reel. Each reel is provided with circumferentially spaced parallel hingedly mounted self-righting trays for systematic and ready maintenance of the aforementioned small articles. In addition, each reel is provided at one end with pawl and ratchet means, whereby the reel may be held in a steady position to render the various articles in the tray conveniently accessible.

Other objects, features and advantages of the invention will become more readily apparent from the following description of the details and the accompanying drawings.

In the drawings, wherein like numerals are employed to designate like parts throughout the views:

Fig. 1 is a plan view of the improved tackle box with the cover sections swung open, uncovering the receptacle portion and rendering the individual reels accessible;

Fig. 2 is a transverse section through the box with the cover sections closed;

Fig. 3 is an enlarged end view of one of the reels (the left end in Fig. 4) detailing the pawl and ratchet means;

Fig. 4 is a fragmentary sectional and elevational view taken on the line 4—4 of Fig. 1;

Fig. 5 is a perspective view of one of the trays;

Fig. 6 is a cross-section through one of the trays; and,

Fig. 7 is an elevation of an insertable and removable divider or partition for the stated tray.

In the drawings (Figs. 1 and 2) it will be seen that the tackle box is characterized by a lower or base section which is here referred to as a receptacle 8 and this embodies a flat bottom 10, longitudinal side walls 12 and transverse end walls 14. This may be referred to as an open-top receptacle and it will be noticed that it is without partitions and is therefore a storage space for various equipment and tackle (not shown). The cover means forms the upper part of the over-all box and it is a so-called "box-type" cover. It is therefore made up of a pair of complemental hood-like half-sections one of which is denoted by the numeral 16 and the other one by the numeral 18. Each half-section embodies longitudinal side walls 20 aligned with the walls 12 and hingedly connected to the upper edges thereof as at 22, end walls 24 and suitably shaped top walls 26 and 28. The end and top walls have their adjacent edges designed to abut each other as at 30 and when the sections are closed they form a hood over the receptacle 8. Suitable latch means and handle means is, of course, provided.

As before stated, one of the objects of the invention is to provide each cover half-section or housing with its own article containing reel. Thus, when the half-sections are swung open as seen in Fig. 1, the respective reels are available. One reel is denoted in Fig. 2 by the numeral 32 and the other one at the right by the numeral 34. Each reel is confined within the space or housing provided therefor in the cover section in which it is mounted. Since both reels are the same in construction a description of one will suffice for both. In practice, it has been found that an appropriate grade of commercial plastics may be satisfactorily used in constructing most if not all of the elements or parts of the over-all reel. Reference being had to Fig. 4, it will be seen that each reel comprises a horizontal shaft 36 having its end portion 38 journaled for rotation in bearing apertures provided in cleat-like washers or brackets 40 which are affixed to the interior surfaces of the end walls 24. Each bracket provides a suitable bearing and permits free rotation of the end portions of the shaft. Centrally affixed to the end portion of the shaft as at 42 are plastic circular or disk-like head plates, the one at the left being denoted by the numeral 44 and the one at the right by the numeral 46. The outer peripheral edge portions 48 are provided wtih equidistant circumferentially spaced inwardly projecting dowel pins which constitute suitable journals or trunnions 50. Spanning the space between the head plates are swingably mounted or cradled elongate trough-like trays 52. The trays are parallel to the shaft and are freely hinged for cradling on the trunnions 50. To accomplish this, the end members 54 are simply provided with upstanding apertured lugs 56 and the lugs are pivotally suspended on their respective trunnions. Thus cradled in place, the trays are self-leveling and self-righting and perform much like the passenger seats in a ferris wheel.

In practice, some of the trays may be without partitions. In other instances, insertable and removable transverse partitions or dividers as at 58 (see Figs. 6 and 7) are used. For example, the divider is provided with lugs 60 at the top and with a centering and anchoring lug 62 at the bottom which fits into a keeper hole 64 provided therefor, the lugs 60 being fitted into retaining notches 66 in an obvious manner. In addition, the trays may be provided with diagonal partitions 68, as shown, for example, in Fig. 1. It follows that each tray may, if desired, be divided into a plurality of small pockets or compartments to further systematize the storing of artificial bait, fishhooks and small articles.

At one end, the lefthand end seen in Fig. 4, the head plate 44 is provided with a superimposed smaller plastic disk or collar 70 which is suitably fixed and is rotatable on the shaft between the plate 44 and the bearing or adapter collar 40. The peripheral edge is provided with circumferentially spaced keeper notches 72 providing what may be described as a ratchet wheel. The notches are intended to accommodate the free end of a tong or pawl 74 which is provided with an attaching member 76 at its bottom secured to an anchoring block or the like 78 mounted on the interior of the wall 24. This pawl and ratchet means obviously serves to stop or retain the reel in a predetermined or set position. It makes it possible for the user to turn the reel to a given position, temporarily retain it in said position and thus have suitable access to the articles in the selected tray.

Whereas in some tackle boxes reels are provided it is sometimes difficult to obtain access to the storage space of the box proper. Here, this space, the receptacle 8 is readily available and the two reels are also available by simply swinging the cover sections to the open position seen in Fig. 1.

Attention is directed to the fact that the cross sectional shape and size of the trays 52 are significant. That is to say, a U-shaped cross section, as distinguished from either a non-circular cross section or a semicircular cross section, is desired. When the box is open and one of the troughs is pushed accidentally, it will not turn over and spill its contents, because the adjacent trough will stop its rotation. This feature is apparent from the drawings. The drawings show that a cross section of the troughs are not circles or portions of circles, but are U's. Circles obviously would mesh like gears if they touched, but U's would stop meshing and jam after a short rotation, depending on the distance between troughs.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in storing and carrying fishing tackle, a box having an open top receptacle portion, cover means normally closing said open-top, said cover means embodying a pair of opposed companion hood-like half-sections, each half-section embodying transverse end walls, a top wall, and a longitudinal side wall, the normal lower lengthwise portion of said longitudinal side wall being hingedly mounted on a cooperating upper edge portion of the adjacent side wall of said receptacle portion, the lengthwise inwardly facing sides of said half-sections being unobstructedly open and in communication with each other and being swingable toward and from each other during the course of opening and closing the half-sections, each half-section constituting a reel housing, a manually regulable reel mounted within the confines of said reel housing but accessible to a user thereof by way of the open side of the half-section when the half-section is swung out to assume a box opening position, each reel comprising an elongated axially disposed shaft, longitudinally spaced circular head plates located inwardly of the end portions of the shaft and fixed centrally to said end portions, the opposed inwardly surfaces of the marginal portions of said head plates being provided with equidistant circumferentially spaced trunnions, elongated article containing open top trays spanning the space between said head plates and spaced in parallelism from said shaft and also spaced circumferentially from each other, each tray having end walls provided with suspension lugs and said lugs being freely hinged on their respective trunnions, a collar carried by at least one of said head plates and having peripheral keeper notches whereby said collar constitutes a ratchet wheel, a resilient pawl fixed on the end wall adjacent said collar and having a free end portion contacting the peripheral edge of said collar and releasably engaging said keeper notches in a manner to normally maintain the reel against rotation in the housing portion of the half-section, and axially aligned brackets affixed to the central interior surfaces of the transverse end walls of said half-section, the adjacent terminal end portions of said shaft being mounted in bearings provided therefor in said brackets, the cross-sectional dimension of said reel being prescribed so that the reel operates within the confines of the housing, whereby the reels in the respective half-sections do not collide or in any manner interfere with each other during the opening and closing movements of the half-sections.

2. For use in storing and carrying fishing tackle, a box having an open top receptacle portion for retention and storage of miscellaneous small articles, cover means normally closing said open top, said cover means embodying a pair of opposed hood-like half-sections, each half section embodying cooperating transverse end walls and intervening walls, one of the latter constituting an outwardly disposed longitudinal side wall and the lower edge thereof being hingedly mounted on a cooperating longitudinal side wall of the receptacle portion, the inwardly facing longitudinal sides of said half-sections being unobstructedly open and swingable toward and from each other, the central portions of said transverse end walls being provided with axially aligned bearings, a manually turnable reel confined and mounted for rotation within the housing of at least one-half-section, said reel embodying a longitudinal shaft having its end portions journaled in said bearings and provided inwardly of the transverse end walls with longitudinally spaced cooperating head plates, the marginal portions of said head plates being provided with equidistant circumferentially spaced journals projecting in directions toward each other, and a plurality of longitudinally extending circumferentially spaced elongated article containing trays spanning the space between said head plates and disposed in spaced parallelism in relation to said shaft, said trays having end walls provided with suspension lugs freely hinged on their respective trunnions, each tray being relatively deep and U-shaped in cross-section, the cross-sectional dimension of each tray and the spaces existing between adjacent trays being predetermined so that the trays are not only self-righting but are self-aligning and upright at all times, whereby if one of said trays is accidentally tilted by a slanting position assumed by the box, or by the box being placed on either side on a support surface, said trays become self-righting and if any one of said trays is accidentally tilted or swung to the left or right of its normal upright position it will strike the next adjacent tray in a manner to prevent spilling of the contents of the tray, and manually regulable pawl and ratchet means cooperating with at least one transverse end wall of the adjacent head plates and serving to normally keep the reel in a set position.

References Cited in the file of this patent
UNITED STATES PATENTS

| | | |
|---|---|---|
| 253,290 | Hunter | Feb. 7, 1882 |
| 425,215 | Franklin | Apr. 8, 1890 |
| 1,893,527 | Shriver | Jan. 10, 1933 |
| 2,646,891 | Morgan | July 28, 1953 |